(12) United States Patent
O'Connor et al.

(10) Patent No.: US 6,779,893 B2
(45) Date of Patent: Aug. 24, 2004

(54) NON-COLLINEAR LIGHT ENGINE FOR COLOR IMAGING SYSTEMS

(75) Inventors: Michael O'Connor, Cupertino, CA (US); Kenneth E. Salsman, Plesanton, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/350,963

(22) Filed: Jan. 24, 2003

(65) Prior Publication Data

US 2004/0145703 A1 Jul. 29, 2004

(51) Int. Cl.⁷ .......................... G03B 21/14; G03B 21/00
(52) U.S. Cl. .......................................... 353/20; 353/33
(58) Field of Search ................... 349/10, 8, 9; 348/790, 348/791, 792, 793, 794, 758–771; 353/30, 31, 32, 33, 34, 37, 81, 84, 98, 99, 122, 20

(56) References Cited

U.S. PATENT DOCUMENTS

| | | | |
|---|---|---|---|
| 6,144,420 A * | 11/2000 | Jung | 349/8 |
| 6,176,583 B1 * | 1/2001 | Sawai | 353/20 |
| 6,217,174 B1 * | 4/2001 | Knox | 353/31 |
| 6,243,198 B1 * | 6/2001 | Sedlmayr | 359/483 |
| 6,262,851 B1 * | 7/2001 | Marshall | 359/634 |
| 6,347,013 B1 | 2/2002 | Hannah | 359/495 |
| 6,362,920 B1 | 3/2002 | Hannah | 359/497 |
| 6,547,399 B2 * | 4/2003 | Knox | 353/31 |
| 6,568,815 B2 * | 5/2003 | Yano | 353/84 |

* cited by examiner

Primary Examiner—Russell Adams
Assistant Examiner—Andrew Sever
(74) Attorney, Agent, or Firm—Trop, Pruner & Hu, P.C.

(57) ABSTRACT

For use with a color imaging system, a projection light engine may be configured in a way such that an output axis of the projection light engine may be in a non-collinear relationship with an input axis of an imaging kernel that provides image data processing to project a display. Undesired polarizations and colors may be dumped out of a critical optical path, using at least two or more ports. As a result, filters and other optical components may be optimized, significantly improving contrast ratios in a projection display system including a color imaging system with at least two panels.

27 Claims, 7 Drawing Sheets

NON-COLLINEAR LIGHT ENGINE FOR COLOR IMAGING SYSTEMS

BACKGROUND

This invention relates generally to light engines for projection display systems, and more specifically to light engines for use with color imaging systems.

Typically, a light source is used for a light engine, enabling projection of images in a display system. As such, many types of light engines may provide light to project color images for a variety of projection display systems, including a color imaging system. An example of such a light engine is a collinear light engine that is shown in FIG. 1 in connection with a color imaging system 5 according to a prior art projection display system. In this example, the prior art system 5 utilizes a light source 10, such as an ultra high-pressure (UHP) lamp 10 to provide light. At the output region of the light source 10, a set of optical components may be disposed, forming an input light beam. The set of optical components may include an ultraviolet and infrared (UV-IR) filter 12, a light pipe homogenizer 14, a color switch or color wheel 16, and a lens 18 by way of one example. However, many of these optical components may have alternate forms. In the configuration shown in FIG. 1, a conventional polarizer, such as an output polarization analyzer 20 may serve to pass the light of a first polarization "P" while skipping or reflecting the light of a second polarization "S." The color switch 16 in combination with the output polarization analyzer 20 may ideally pass red light through, for example, and selectably switch or alternate between either passing blue light and reflecting green light or passing green light and reflecting blue light.

The prior art system 5 may further include an imaging pre-filter, i.e., an RC1 filter 22 which is deployed in the output region of the lens 18. A polarization beam splitter (PBS) 24 with a first side facing the RC1 filter 22 may additionally be provided thereafter. In the same way, on a second side of the PBS 24, a quarter-wave ($\lambda/4$, $\lambda$ being the wavelength) retarder 26 and a first spatial light modulator (SLM) 28 may be located. Yet another quarter-wave retarder 30 and a second SLM 32 may be provided on a third side of the PBS 24. In operation, an electronic drive may present to the first SLM 28 image data that alternates between blue and green image data, while the second SLM 32 may be presented only with red image data. A clean-up polarizer 38, and a projection lens 40 may be configured on a fourth side of the PBS 24 to provide an output beam based on a particular electronic drive, presenting image data in a specific format including a red-blue-green (RGB) format, as one example.

Taken together, the prior art system 5 may typically be said to include a light engine incorporating the elements 10, 12 and 14, a color switch subsystem including the elements 16, 18 and 20, an imaging subsystem or kernel comprising the elements 22 through 38, and a projection subsystem that includes element 40. In particular, the color switch subsystem may be said to have an input axis ($Axis_{IKin}$) through the first side of the PBS 24, and the light source 10 which may be said to have an output axis ($Axis_{LEout}$) through the light pipe homogenizer 14. Because the in put axis of the color switch subsystem is in a coaxial or a collinear orientation with respect to the output axis of the light source 10, the prior art system 5 is usually characterized as a collinear panel-based projection display system.

As such, for a host of projection display systems including a panel-based color imaging system depicted in FIG. 1, among other design features, contrast ratio is often a significant design feature. However, leakage of light with an incorrect polarization through the color switch 16 and the output polarization analyzer 20 typically contributes to the background leakage illumination, reducing the contrast ratio. For example, if the color switch 16 imperfectly switches between blue and green, some amount of the reflected color light may pass through to the first SLM 28 while it is still modulating the earlier passed color light.

In the prior art system 5, the color switch 16 while passing green light (on the left) may undesirably reflect blue light (on the right), causing the blue leakage light ($B_L$) to appear in the output beam from the projection lens 40. Because of the architectural configuration of this system 5, imperfections in the operation of the output polarization analyzer 20 may further contaminate the output beam. The input filter (UV-IR filter 12) may also improperly reflect the "S" polarization green light (on the left, shown as a dashed line). As a result, this green light leakage may strike the first SLM 28 along with the "P" polarization green light, reflecting both the green light and leakage thereof into the output beam (shown as $G_L$ and G, respectively). Therefore, leakage of light with the incorrect polarization, onto the spatial light modulators and into the output beam may cause undesirable degradation of a projected image in a panel-based color imaging system.

Thus, there is a continuing need for better ways to configure light engines for use with projection display systems, especially in connection with color imaging systems.

DETAILED DESCRIPTION

Figure 1:
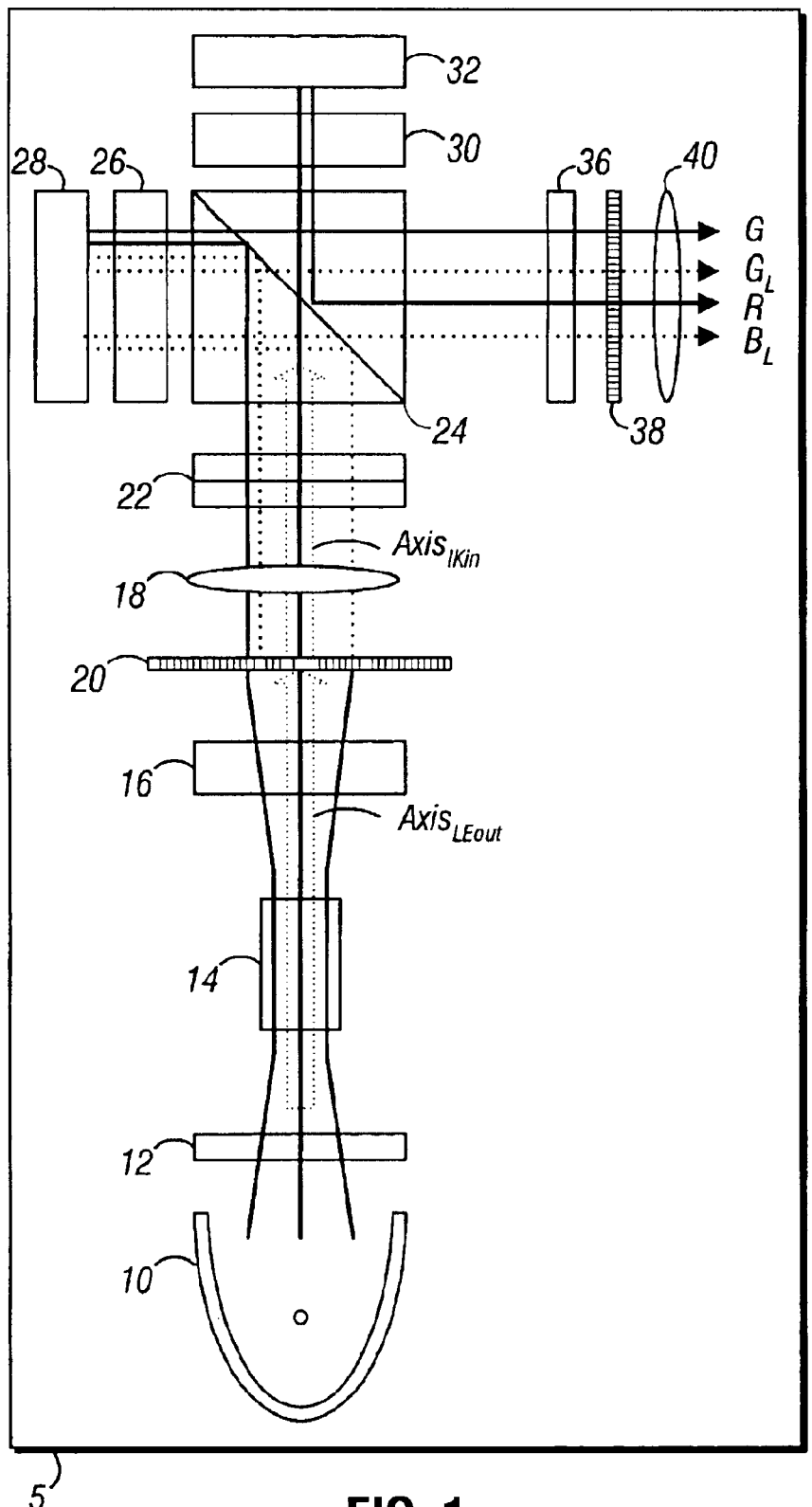
FIG. 1 shows a schematic depiction of a prior art panel-based color imaging system.
Figure 2:
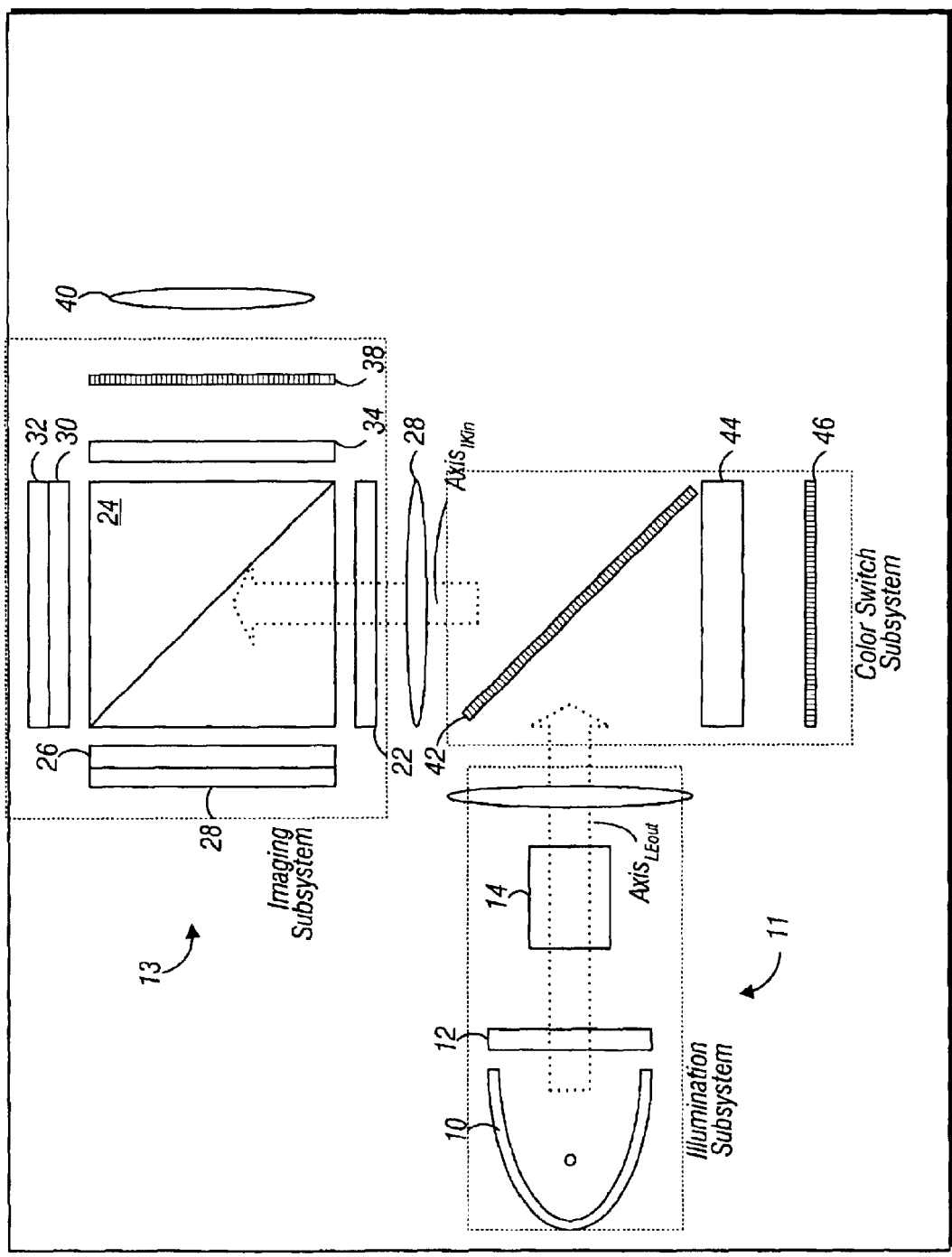
FIG. 2 shows a schematic depiction of a panel-based color imaging system according to one embodiment of the present invention.

A panel-based color imaging system 15 shown in FIG. 2 may include an imaging subsystem or kernel 13 in which the input axis is in a non-collinear relationship with the output axis of a light engine 11 associated with an illumination subsystem, according to one embodiment of the present invention. As can be seen in FIG. 2, similar components of the panel-based color imaging system 15 use the same reference numerals as their counterparts, in the prior art system 5 shown in FIG. 1. This does not, however, mean that these components are required to be identical because various components in different embodiments of the present invention, may be altered, substituted, omitted, or added based on a specific projection display system architecture. Specifically, the output polarization analyzer 20 of the prior art system 5, which is oriented perpendicularly to the light source's 10 output axis and the color switch subsystem's input axis, may be replaced in one embodiment of the present invention with an input polarization beam splitter (PBS) 42 which may comprise a MacNeille PBS or a wire grid plate PBS, as a few examples.

In one example, the input and output axes, i.e. ($Axis_{IKin}$), and ($Axis_{LEout}$) may be oriented at 90° relative to each other. Instead of configuring the two axes perpendicular to each other, in some embodiments, different non-collinear orientations may be selected based on a particular application at hand, such as one involving an optimal angular incident on a first polarizer, i.e., the input PBS 40. For many embodiments in which the input and output axes are oriented at 90° to each other, the input PBS 42 may be disposed at 45° angles to both the axes. Other angles between the input and output axes may certainly be used, so long as there are adequate dump ports for dumping undesired light out of one or more optical paths of the panel-based color imaging system 15.

Even though a two-panel (or two PBS) color imaging system 15 is shown in FIG. 2 according to one embodiment; however, in many embodiments, multi-panel-based color imaging systems may be devised without departing away from the spirit of the present invention. An example of a panel is a liquid crystal over silicon (LCOS) panel, forming screen projection displays in projection display systems. Consistent with numerous embodiments of the present invention, color schemes other than a red-green-blue (RGB) format may be employed since the RGB format is simply used here for illustration purposes only.

According to few examples of the present invention, essentially the reduction of the leakage of the green and/or blue light, i.e., green and blue "P" polarizations from a critical optical path before this leakage reaches the imaging subsystem or kernel 13, may provide desired color yield with a relatively lower color loss. In other words, color corner coordinates may be improved while increasing brightness. A critical optical path may refer to an optical path from the light source 10 to the projection lens 40 in many examples of the present invention. Because even a low-level of leakage of undesired green and/or blue light may limit the extent to which a display screen may appear blank, by dumping green and/or blue light of the incorrect polarization out of the optical path from the light engine 11 and the projection lens 40, contrast ratio may be significantly improved in projection display systems which may incorporate two or more panels.

The panel-based color imaging system 15 further includes a color switch 44 that, in some situations, may ideally pass red light, and switch between passing either green and/or blue light. To retard the red light by one quarter-wave ($\lambda/4$, $\lambda$ being the wavelength), the color switch 44 may include a red twist filter. In other implementations, the red twist filter may be a separate element from the color switch 44. Opposite the color switch 44, a turn-around polarizer 46 may be provided in the reflection output path of the input PBS 42. In some embodiments, the turn-around polarizer 46 may comprise a MacNeille PBS or a wire grid plate PBS, as two examples. In addition, the color switch 44 may switch phase of all three colors in many cases.

Figure 3:
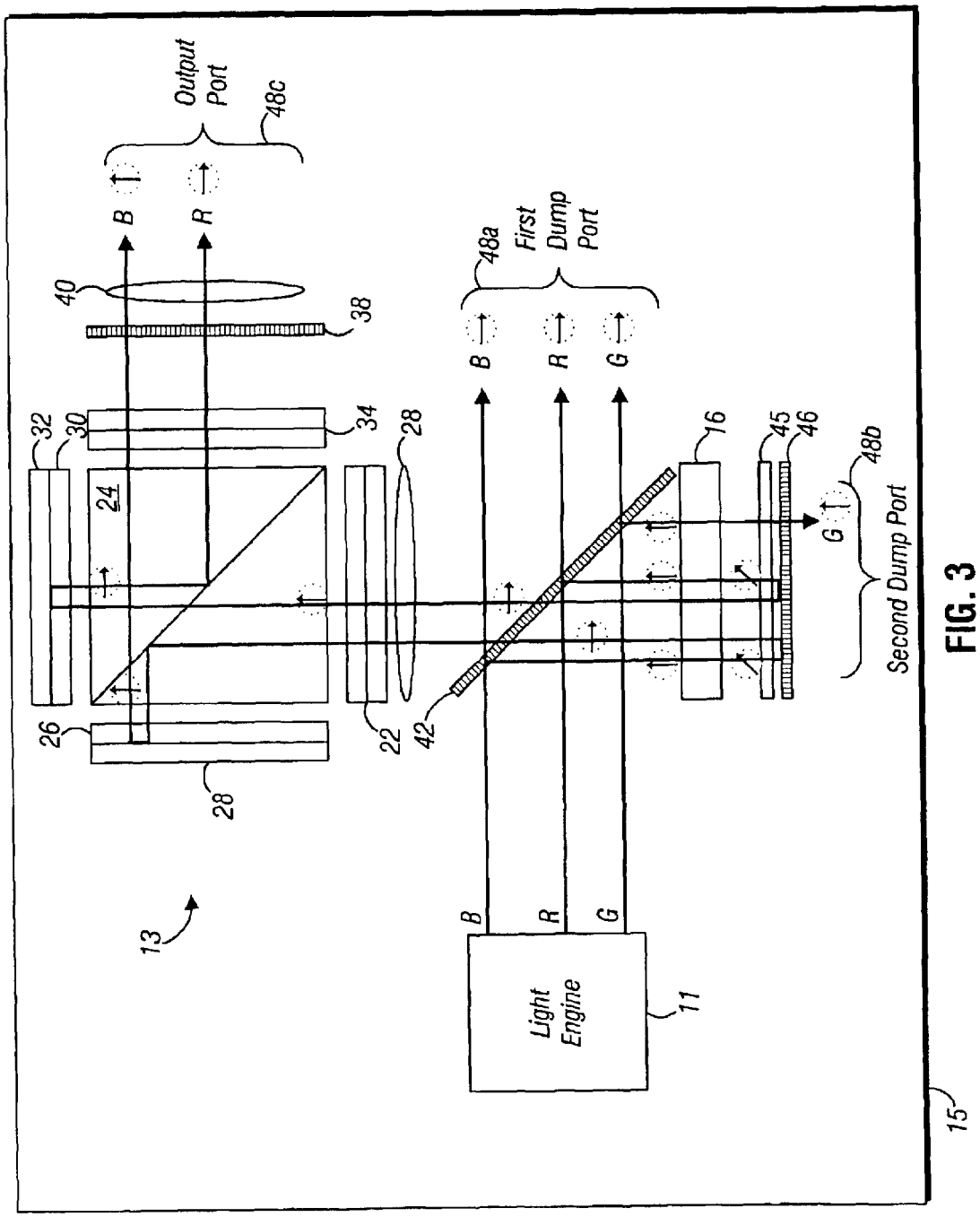
FIG. 3 shows an operation in accordance with one embodiment of the present invention, particularly involving a red/blue phase switching in the panel-based color imaging system shown in FIG. 2.

Although not so limited in this respect, according to one operation consistent with an embodiment of the present invention as shown in FIG. 3, the panel-based color imaging system 15 shown in FIG. 2 may involve red/blue phase switching, outputting the red and blue colors. Upon appropriate activation, at some point the light engine 11 may emit red light (R), green light (G), and blue light (B), providing three color beams that strike the input PBS 42. The three color beams may include a first polarization "P" that passes through the input PBS 42, exiting from a first dump port 48a. In other words, the first polarization "P" may be discarded. However, light from the second polarization "S" may be reflected to the color switch 16.

For the panel-based color imaging system 15 shown in FIG. 3, a polarization filter, i.e., a RC3 filter 45 may be disposed beside the color switch 16 on the side opposite the input PBS 42, in accordance with one embodiment of the present invention. The RC3 filter 45 may be configured to provide a color selective phase retardation. As an example, the RC3 filter 45 may rotate polarization of red light by 45 degrees.

Using the color switch 16, the red and blue light may be phase retarded by 45° when passing through the color switch 16. However, the green light is reflected by the color switch 16, and is not phase retarded as illustrated in FIG. 3. In any event, light passing through the color switch 16 strikes the turn-around polarizer 46. While the light which has been phase retarded during a first pass by the color switch 16 may be substantially reflected by the turn-around polarizer 46 when returning back toward the color switch 16, the light which has not been phase retarded by the color switch 16 in the first pass may travel through the turn-around polarizer 46, essentially getting discarded into a second dump port 48b.

After being reflected by the turn-around polarizer 46 when the red and blue light pass through the color switch 16, the color switch 16 may impart an additional 45° twist to both the red and blue light. In this manner, on return into the imaging subsystem or kernel 13, the red and blue light may again encounter the input PBS 42 albeit 90° rotated from the polarization at which they initially encountered the input PBS 42, while passing through the input PBS 42 on their way to the turn-around polarizer 46.

Depending upon a particular electronic drive deployed for presenting image data, an appropriate image data processing may be performed at the imaging subsystem or kernel 13 for which an imaging post-filter, i.e., the RC2 filter 34 may provide post-filtering in some examples of the present invention. For the imaging subsystem or kernel 13, in some cases, a second polarizer, i.e., the PBS 24 may pass the red light onto the non-switched SLM 32 and reflect the blue light onto the switched SLM 28. Each SLM (28, 32) may be preceded by a respective quarter-wave retarder (26, 30) which, after the light passes through in each direction, imparts 90° twist, directing the modulated light as an output beam out from the fourth side heading towards an output port 48c. Before propagating onward to the projection lens 40, the output beam then encounters the RC2 filter 34 that shapes and focuses the output beam onto a display surface or a screen (not shown), forming a projected image of the image data made available to the panel-based color imaging system 15.

In this manner, the incorrect polarization (e.g. "P" polarization) of the switched colors may be substantially removed from the optical path before the imaging subsystem or kernel 13 itself. For instance, the unswitched light, (e.g., red light) is significantly filtered, reducing leakage. Having multiple dump ports (e.g., first and second dump ports 48a, 48b) through which incorrectly-polarized light and undesired color light may be discarded out of the optical path, allowing independent optimization of the RC1 filter 22, RC2 filter 34, and RC3 filter 45 in some embodiments. Accordingly, the output beam may be appropriately polarized, as several dump ports perform repeated clean-up of various undesired colors of light, in some embodiments of the present invention.

Figure 4:
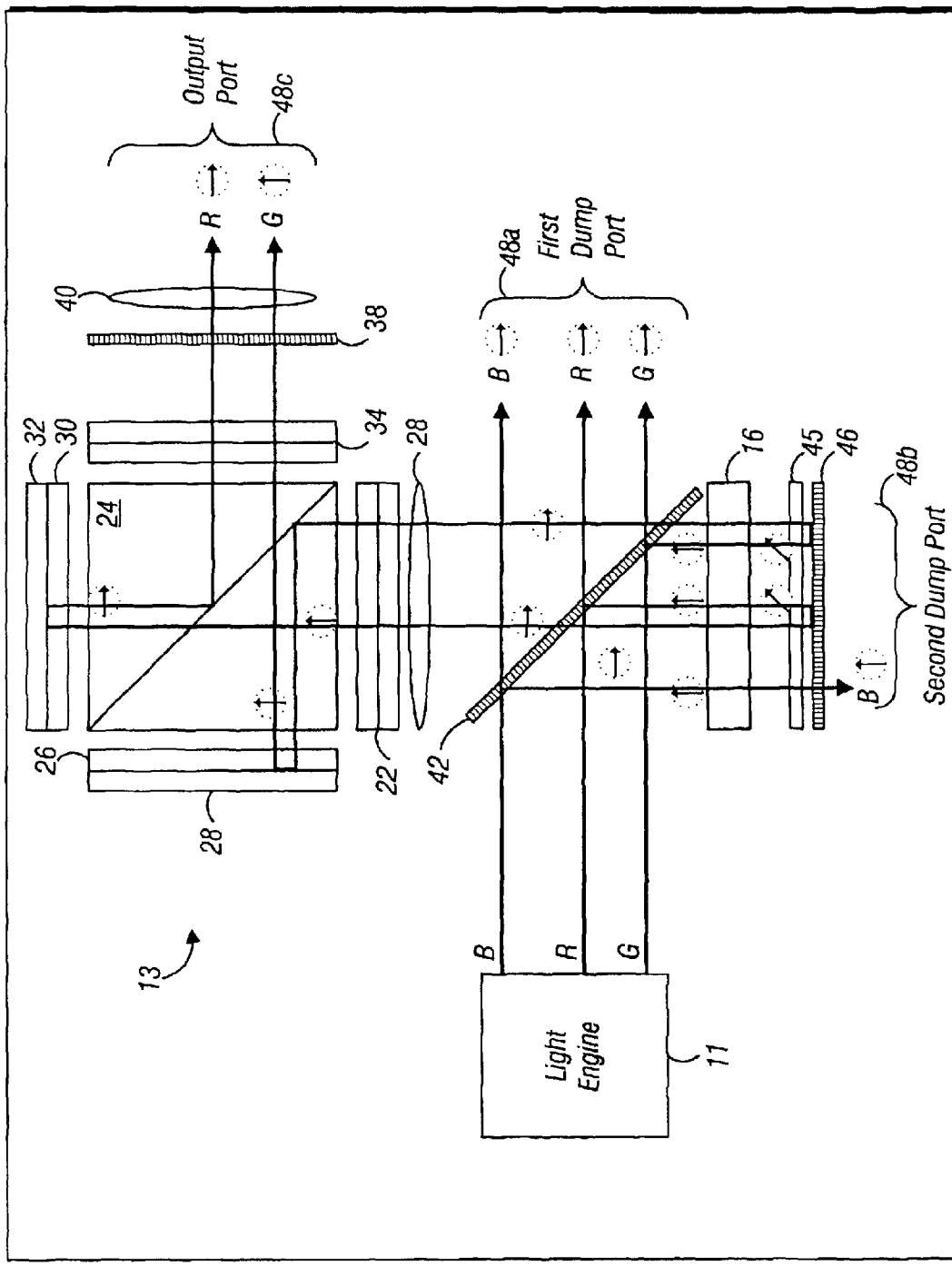
FIG. 4 shows another operation according to an embodiment of the present invention, especially involving a red/green phase switching in the panel-based color imaging system shown in FIG. 2.

Referring to FIG. 4, an operation for a particular embodiment involving the red/green phase switching is shown for the panel-based color imaging system 15 depicted in FIG. 3. As shown in FIG. 4, the red/green phase switching may be undertaken in a substantially similar fashion as that of the red/blue phase switching operation set forth in FIG. 3. First, the "P" polarization of each color is discarded, using the first dump port 48a. The remaining blue light may be discarded subsequently via the second dump port 48b while the red and green light may undergo appropriate processing in the imaging system or kernel 13 by way of an example.

Figure 5:
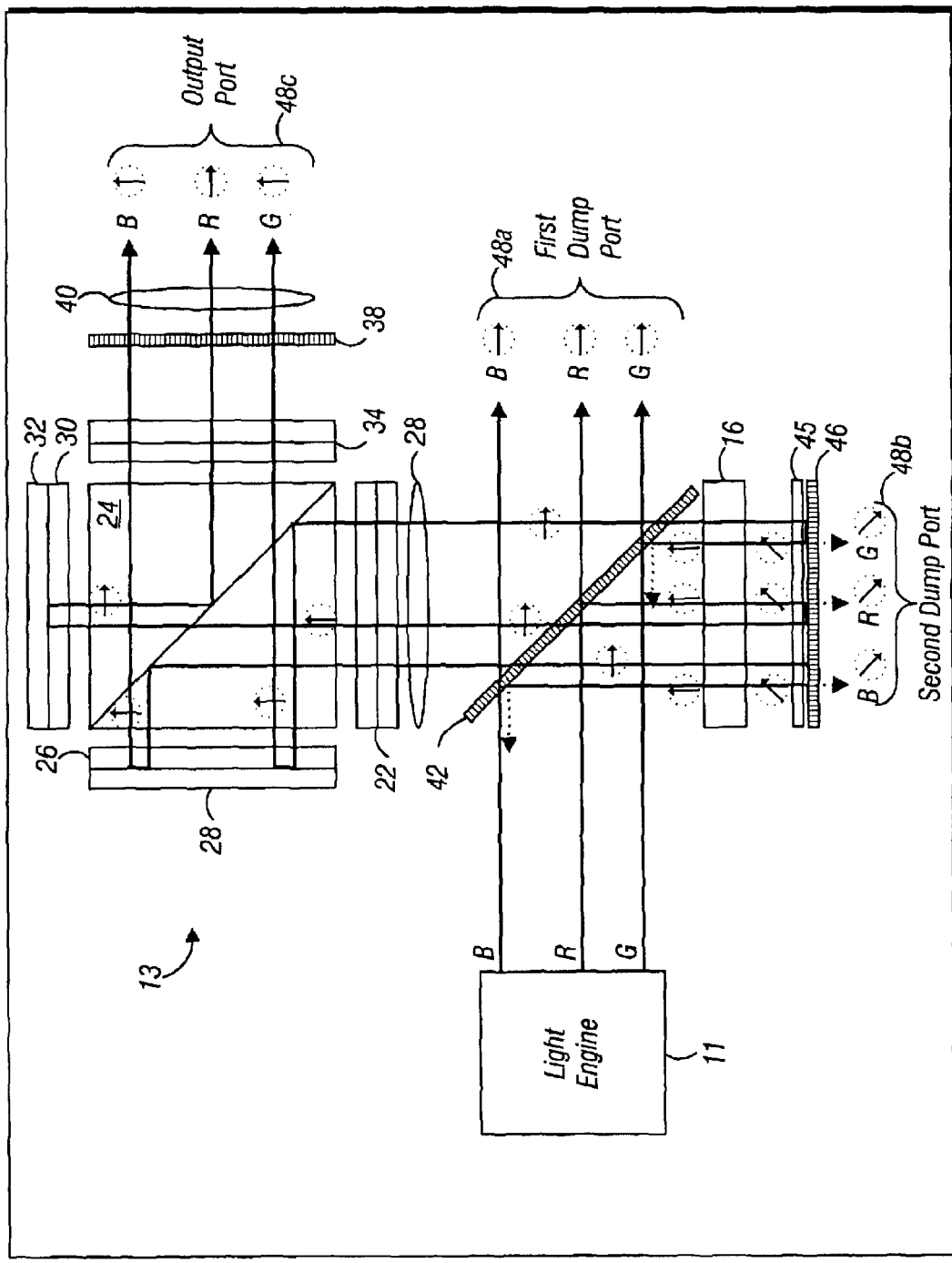
FIG. 5 shows one operation consistent with an embodiment of the present invention, showing dumping of leakage of light with an incorrect polarization in the panel-based color imaging system shown in FIG. 2.

Turning now to FIG. 5, as indicated above, one operation according to some embodiments of the present invention calls for dumping leakage of undesired color light. This dumping of the leakage of undesired color light, however, is set forth only in a general sense, and is not necessarily associated with either the red/blue phase switching illustrated in FIG. 3 or the red/green phase switching included in FIG. 4 in particular. When the input PBS 42 imperfectly passes the "P" polarization light, a reflection of some small portion thereof may result in leakage of light which, however, gets discarded into the second dump port 48b, advantageously providing a relatively better contrast ratio in some cases.

Figure 6:
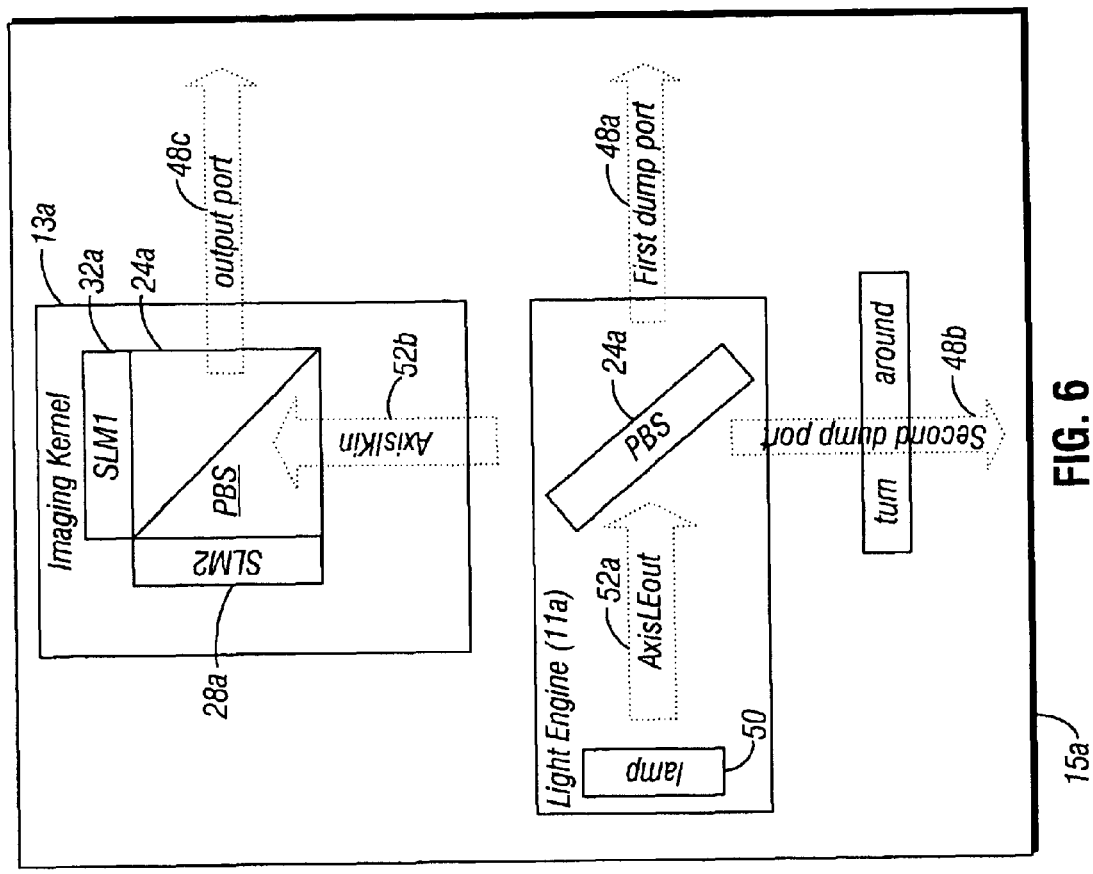
FIG. 6 shows for the panel-based color imaging system shown in FIG. 2 an architecture highlighting the non-collinear configuration consistent with one embodiment of the present invention.

Referring to FIG. 6, an architectural layout of a panel-based color imaging system 15a is shown in a non-collinear configuration consistent with one embodiment of the present invention. The panel-based color imaging system 15a includes a light engine 11a incorporating a lamp 50. The panel-based color imaging system 15a may be configured to have the light engine 11a with an output axis (Axis$_{LEout}$) 52a of a first orientation. The light engine 11a may include at least one dump port or in some embodiments more, such as the first and second dump ports 48a and 48b. The panel-based color imaging system 15a further includes an imaging kernel 13a comprising a polarization beam splitter 24a with an input axis (Axis$_{IKin}$) 52b of a second orientation having a non-collinear relationship with the first orientation of the output axis 52a in the light engine 11a. Based on a particular application, the imaging kernel 13a may include one or two SLMs 28a and 32a in addition to the output port 48c.

Figure 7:
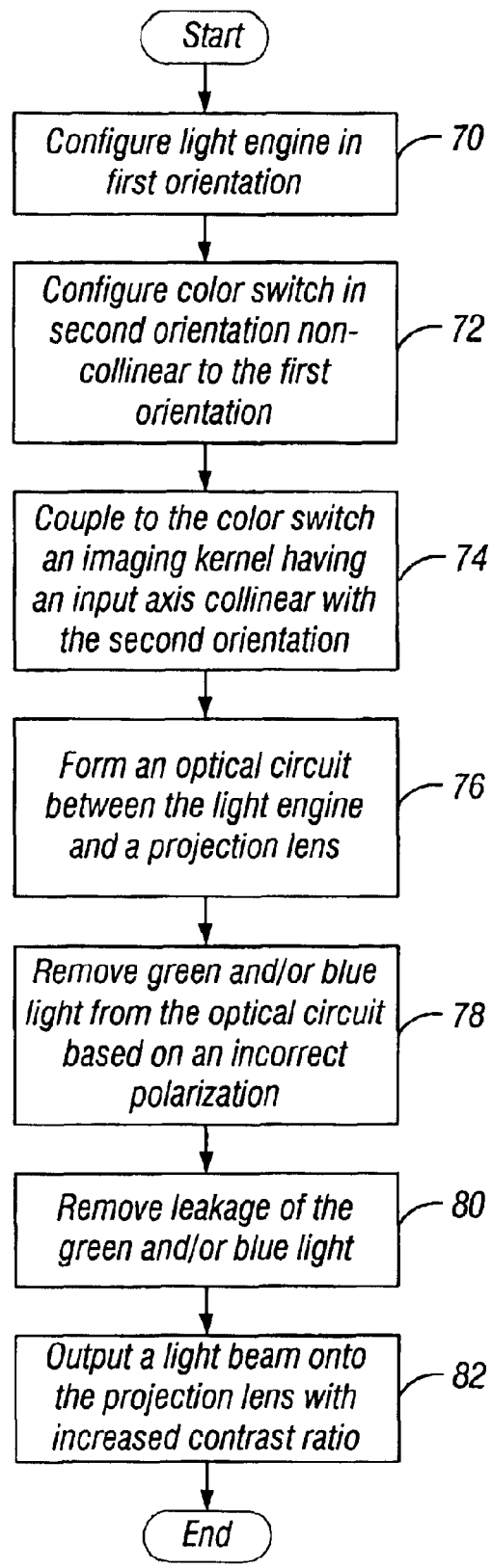
FIG. 7 shows a flow chart for the panel-based color imaging system shown in FIG. 2 in accordance with one embodiment of the present invention.

Referring to FIG. 7, according to one operation consistent with an embodiment of the present invention, for the color imaging system 15 shown in FIG. 3, the light engine 11 may be configured in a first orientation at block 70. In contrast, at block 72, the color switch 16 may be configured in a second orientation non-collinear to the first orientation. However, the imaging subsystem or kernel 13 may have its input axis collinear with the second orientation. For purposes of projecting displays, the imaging subsystem or kernel 13 may be optically coupled to the color switch 16 at block 74.

At block 76, an optical circuit including intermediate optical components (e.g., including but not limited to color switch 16, turn-around polarizer 46, input PBS 42, imaging kernel or subsystem 13) may be formed between the light engine 11 and the projection lens 40, as shown in FIG. 3. In some embodiments, the light from the light engine 11 may be passed through the color switch 16, allowing desired optimization of filter characteristics of the imaging pre-filter (e.g., the RC1 filter 22), the imaging post-filter (e.g., the RC2 filter 34), and a wide band red bi-refringent polarization filter (e.g., the RC3 filter 45). Based on an incorrect polarization, green and/or blue light may be removed from the optical circuit at block 78. Likewise, leakage of the green and/or blue light may be removed at block 80. Furthermore, independent optimizations of the RC1, RC2 and RC3 filters 22, 34 and 45 may be obtained by removing the green and/or blue light leakages in some embodiments of the present invention. In this way, an output light beam may be provided onto the projection lens 40 with a substantially increased contrast ratio for a non-collinear color imaging system at block 82.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
   a light engine having an output axis in a first orientation to provide a light source for said apparatus having at least two or more panels, wherein said light engine includes a polarization beam splitter and at least two light ports to dump undesirable light from said polarization beam splitter out of said apparatus; and
   an imaging kernel optically couplable to the light engine to project a display based on an image data, said imaging kernel having an input axis in a second orientation substantially non-collinear to the first orientation.

2. The apparatus of claim 1 wherein the first orientation and the second orientation are substantially perpendicular to each other to reduce incorrectly polarized light and leakage thereof from said light source.

3. An apparatus comprising:
   a light engine having an output axis in a first orientation to provide a light source for said apparatus having at least two or more panels, wherein said light engine includes at least two light ports to dump undesirable light out of said apparatus; and
   an imaging kernel optically couplable to the light engine to project a display based on an image data, said imaging kernel having an input axis in a second orientation substantially non-collinear to the first orientation, wherein the imaging kernel includes a first and a second spatial light modulator coupled to a polarization beam splitter.

4. The apparatus of claim 3, further comprising:
   a polarizer coupled in the output axis of the light engine to receive from the light engine said light source in a red, green, and blue light color format.

5. An apparatus comprising:
   a light engine having an output axis in a first orientation to provide a light source for said apparatus having at least two or more panels, wherein said light engine includes at least two light ports to dump undesirable light out of said apparatus;
   an imaging kernel optically couplable to the light engine to project a display based on an image data, said imaging kernel having an input axis in a second orientation substantially non-collinear to the first orientation; and a color switch coupled to the light engine to provide phase switching of at least one of red, green and blue light of the red, green, and blue light color format based on an arrangement of one or more filters.

6. An apparatus comprising:
a light engine having an output axis in a first orientation, said light engine including a light source for said apparatus having at least two or more panels, wherein the light engine includes at least two ports to dump undesirable light out of said apparatus;
a first polarization beam splitter coupled in the output axis to receive a light beam from the light source;
a color switch coupled to receive light reflected by the input polarization beam splitter;
a turn-around polarizer coupled to reflect light incident from the color switch back to the color switch; and
an imaging kernel having an input axis in a second orientation in a substantially non-collinear relationship with the first orientation, said imaging kernel including,
a second polarization beam splitter having a first, a second, a third, and a fourth side coupled to receive light from the light engine through the first side, and
a first spatial light modulator coupled to one of the second and third sides, wherein the imaging kernel to provide a content-modulated output beam through the fourth side.

7. The apparatus of claim 6 wherein the imaging kernel further includes:
a second spatial light modulator coupled to another of the second and third sides.

8. The apparatus of claim 7 wherein the light engine further includes:
a light pipe homogenizer; and
a lens.

9. The apparatus of claim 6 wherein the imaging kernel further includes:
a filter disposed between the first side of the second polarization beam splitter and the first polarization beam splitter;
a first quarter-wave retarder disposed between the second polarization beam splitter and the first spatial light modulator; and
a filter and a projection lens disposed in a path of the content-modulated output beam.

10. A color imaging system comprising:
a light pipe homogenizer located in a first axis to receive light from a light source;
a lens disposed in the first axis after the light pipe homogenizer;
an input polarization beam splitter disposed in the first axis after the lens;
a first dump port oriented in the first axis after the input polarization beam splitter for dumping light of a first polarization;
a color switch coupled to receive light of a second polarization from the input polarization beam splitter in the first axis;
a first quarter-wave retarder coupled to receive light from the color switch in the first axis;
a turn-around polarizer coupled to receive light from and reflect light back through the first quarter-wave retarder and the color switch in the first axis;
a polarization beam splitter having a first side perpendicular to a second axis, wherein the second axis is in a different orientation than the first axis;
a second dump port oriented in the second axis after the turn-around polarizer;
a second quarter-wave retarder and a first spatial light modulator coupled to one of a second side and a third side of the polarization beam splitter; and
an output port located at a fourth side of the polarization beam splitter.

11. The color imaging system of claim 10, wherein the second axis is in a non-collinear relationship with the first axis.

12. The color imaging system of claim 11 wherein the second axis is substantially perpendicular to the first axis.

13. The color imaging system of claim 12 further comprising:
a fourth quarter-wave retarder and a second spatial light modulator coupled to another of the second side and the third side of the polarization beam splitter.

14. The color imaging system of claim 12 wherein the color switch switches at least one of blue and green light and the first spatial light modulator comprises a blue/green spatial light modulator.

15. The color imaging system of claim 14, wherein the color switch switches blue, red, and green light and the first spatial light modulator comprises a blue/red/green spatial light modulator.

16. The color imaging system of claim 14, wherein the color switch passes red light and the apparatus further comprises:
a fourth quarter-wave retarder and a second spatial light modulator coupled to another of the second side and the third side of the polarization beam splitter.

17. A method comprising:
receiving a light beam from a light engine having an output axis of a first orientation in a panel-based color imaging system to project a display based on an image data
directing the light beam to a polarization beam splitter to dump undesirable light from one of at least two available dump ports of the panel-based color imaging system; and
providing a color switch in a second orientation for an imaging kernel having an input axis collinear with the second orientation, wherein the first and second orientations are in a substantially non-collinear relationship.

18. The method of claim 17 including forming an optical circuit between the light engine and a projection lens that receives an output beam corresponding to the light beam passing through the color switch and the imaging kernel.

19. The method of claim 18 including:
creating a path to remove at least one of green and blue light from the optical circuit based on an incorrect polarization; and
reducing leakage of the at least one of green and blue light to increase contrast ratio.

20. A method comprising:
configuring a light engine in a first orientation for a color imaging system having at least two or more panels with at least two light dump ports to dump undesirable light out of said color imaging system; and
optically coupling to the light engine a color switch in a second orientation being in a non-collinear relationship with the first orientation to project a display based on an image data.

21. The method of claim 20 including coupling to the color switch an imaging kernel having an input axis collinear with the second orientation.

22. The method of claim 21 including forming an optical circuit incorporating one or more intervening optical components between the light engine and a projection lens.

23. The method of claim 22 including:
reducing at least one of green and blue light from the optical circuit based on an incorrect polarization; and
reducing leakage of the at least one of green and blue light.

24. The method of claim 23 including providing an output beam onto the projection lens to form said display from the image data with a significantly increased contrast relative to a collinearly configured the first and second orientations.

25. The method of claim 20 including configuring the color switch to cause a light beam to pass at least twice therethrbugh.

26. The method of claim 20 including providing a polarizer in the optical circuit that performs both a pre-polarization before the color switch and a clean-up polarization after the color switch of the light beam.

27. The method of claim 20 including providing independent optimization of a color polarization filter, an imaging pre-filter and an imaging post-filter by reducing leakage of at least one of green and blue light.

* * * * *